(12) United States Patent
Sunkara et al.

(10) Patent No.: US 8,759,559 B2
(45) Date of Patent: Jun. 24, 2014

(54) PROCESSES FOR PREPARING POLYTRIMETHYLENE ETHER GLYCOL ESTERS

(75) Inventors: Hari Babu Sunkara, Hockessin, DE (US); Sam Cotterill, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 92 days.

(21) Appl. No.: 13/449,862

(22) Filed: Apr. 18, 2012

(65) Prior Publication Data
US 2013/0281723 A1    Oct. 24, 2013

(51) Int. Cl.
C11C 3/00    (2006.01)
C07C 69/66    (2006.01)

(52) U.S. Cl.
USPC .......................................... 554/172; 560/179

(58) Field of Classification Search
USPC .......................................... 554/172; 560/179
See application file for complete search history.

(56) References Cited

U.S. PATENT DOCUMENTS

| | | | |
|---|---|---|---|
| 2,599,803 A * | 6/1952 | Ballard et al. ................ 508/474 |
| 5,015,789 A | 5/1991 | Arntz et al. | |
| 5,276,201 A | 1/1994 | Haas et al. | |
| 5,284,979 A | 2/1994 | Haas et al. | |
| 5,334,778 A | 8/1994 | Haas et al. | |
| 5,364,984 A | 11/1994 | Arntz et al. | |
| 5,364,987 A | 11/1994 | Haas et al. | |
| 5,633,362 A | 5/1997 | Nagarajan et al. | |
| 5,686,276 A | 11/1997 | Laffend et al. | |
| 5,821,092 A | 10/1998 | Nagarajan et al. | |
| 5,962,745 A | 10/1999 | Brossmer et al. | |
| 6,140,543 A | 10/2000 | Brossmer et al. | |
| 6,232,511 B1 | 5/2001 | Haas et al. | |
| 6,235,948 B1 | 5/2001 | Sunkara et al. | |
| 6,277,289 B1 | 8/2001 | Kurian et al. | |
| 6,297,408 B1 | 10/2001 | Haas et al. | |
| 6,331,264 B1 | 12/2001 | Kurian et al. | |
| 6,342,646 B1 | 1/2002 | Haas et al. | |
| 6,372,929 B1 | 4/2002 | Ridland et al. | |
| 6,720,459 B2 | 4/2004 | Sunkara et al. | |
| 6,977,291 B2 | 12/2005 | Sunkara et al. | |
| 7,038,092 B2 | 5/2006 | Sunkara et al. | |
| 7,074,969 B2 | 7/2006 | Sunkara et al. | |
| 7,084,311 B2 | 8/2006 | Sunkara et al. | |
| 7,098,368 B2 | 8/2006 | Seapan et al. | |
| 7,157,607 B1 | 1/2007 | Sunkara et al. | |
| 7,161,045 B1 | 1/2007 | Sunkara et al. | |
| 7,164,046 B1 | 1/2007 | Sunkara et al. | |
| 2004/0030095 A1 * | 2/2004 | Sunkara et al. ................ 528/425 |
| 2004/0158004 A1 | 8/2004 | Ng | |
| 2005/0020805 A1 | 1/2005 | Sunkara et al. | |
| 2005/0069997 A1 | 3/2005 | Adkesson et al. | |
| 2009/0092569 A1 | 4/2009 | Sunkara et al. | |
| 2010/0261932 A1 | 10/2010 | Sunkara et al. | |

FOREIGN PATENT DOCUMENTS

WO    0144348 A1    6/2001

OTHER PUBLICATIONS

Johnson et al. "Carboxylic Acid, Manufacture"—Abstract and Article, Kirk-Othmer Encyclopedia of Chemical Technology, Dec. 4, 2000.*
Currie, Source Apportionment of Atmospheric Particles, Characterization of Environmental Particles, J. Buffle and H.P. Van Leeuwen, EDS., 1 of vol. I of the IUPAC Environmental Analytical Chemistry Series (Lewis Publishers, INC) (1992), pp. 3-74.
Hsieh, Division S-3: Soil Microbiology & Biochemistry, Pool Size and Mean Age of Stable Soil Organic Carbon in Cropland, Soil Sci. Soc. Am. J., vol. 56 (1992), pp. 460-464.
International Patent Application, Corresponding PCT Application No. PCT/US2013/035547, filed Apr. 8, 2013.

* cited by examiner

*Primary Examiner* — Deborah D Carr

(57) ABSTRACT

Provided are processes for preparing polytrimethylene ether glycol monoester or diesters composition wherein polytrimethylene ether glycol containing less than about 1 weight % of unreacted diol monomer is reacted with an equivalent excess of a monocarboxylic acid.

9 Claims, No Drawings

PROCESSES FOR PREPARING POLYTRIMETHYLENE ETHER GLYCOL ESTERS

FIELD OF THE INVENTION

This invention relates to processes for making monocarboxylic acid esters (monoesters and/or diesters) of polytrimethylene ether glycol.

BACKGROUND

Certain monocarboxylic acid mono- and diesters of polytrimethylene ether glycol (PO3G) are expected to have properties that make them useful in a variety of fields, including as lubricants and plasticizers. Standard methods of manufacture include the polycondensation of the monomer in the presence of an acid catalyst with subsequent esterification in the same reaction vessel. However, subsequent purification of acid residues may be necessary.

Disclosed herein are methods for preparing polytrimethylene ether glycol esters starting with the glycol polymer with low levels of unreacted diol monomer.

SUMMARY

One aspect of the present invention is a process for preparing a composition comprising a monocarboxylic acid ester of a polytrimethylene ether glycol comprising:
(a) providing a polytrimethylene ether glycol having a number average molecular weight of about 250 to about 5000 and containing less than about 1 weight % of unreacted diol monomer;
(b) heating the polytrimethylene ether glycol for at least 5 hours under inert gas at an initial pressure and at a temperature of about 160° C. to about 250° C. in the presence of a molar excess of one or more monocarboxylic acids or monocarboxylic acid equivalents to form a reaction mixture;
wherein the one or more monocarboxylic acids have the formula R—COOH, wherein R is an a substituted or unsubstituted aromatic, saturated linear or branched aliphatic, unsaturated aliphatic, or cycloaliphatic organic group containing from 6 to 40 carbon atoms;
to form a polytrimethylene ether glycol monoester or diester, or mixtures thereof.

DETAILED DESCRIPTION

The processes disclosed herein provide the advantage of preparing the ester directly from the polymer, allowing for easier purification with fewer acid residues than processes that include the polycondensation of the monomer.

One embodiment is a process for preparing a monocarboxylic acid ester of a polytrimethylene ether glycol comprising:
(a) providing a polytrimethylene ether glycol (PO3G) having a number average molecular weight of about 250 to about 5000 and containing less than about 1 weight % of unreacted diol monomer;
(b) heating the polytrimethylene ether glycol for at least 5 hours under inert gas at an initial pressure and at a temperature of about 160° C. to about 250° C. in the presence of a molar excess of one or more monocarboxylic acids or monocarboxylic acid equivalents to form a reaction mixture;
wherein the monocarboxylic acid has the formula R—COOH or a monocarboxylic acid equivalent thereof, wherein R is an a substituted or unsubstituted aromatic, saturated aliphatic, unsaturated aliphatic, linear or branched or cycloaliphatic organic group containing from 6 to 40 carbon atoms; to form a polytrimethylene ether glycol ester or diester, or mixtures thereof.

The processes disclosed herein include the esterification of PO3G by reaction with a monocarboxylic acid and/or equivalent.

By "monocarboxylic acid equivalent" is meant compounds that perform substantially like monocarboxylic acids in reaction with polymeric glycols and diols, as would be generally recognized by a person of ordinary skill in the relevant art. Suitable monocarboxylic acid equivalents, for example, esters of monocarboxylic acids, and ester-forming derivatives such as acid halides (e.g., acid chlorides) and anhydrides.

Preferably, the monocarboxylic acid has the formula R—COOH, wherein R is a substituted or unsubstituted aromatic, saturated linear or branched aliphatic, unsaturated aliphatic, or cycloaliphatic organic group containing from 6 to 40 carbon atoms. Mixtures of different monocarboxylic acids and/or equivalents are also suitable.

As indicated above, the monocarboxylic acid or equivalent can be aromatic, aliphatic or cycloaliphatic. As used herein, "aromatic" monocarboxylic acids are monocarboxylic acids in which a carboxyl group is attached to a carbon atom in a benzene ring system such as those below. "Aliphatic" monocarboxylic acids are monocarboxylic acids in which a carboxyl group is attached to a fully saturated carbon atom or to a carbon atom which is part of an olefinic double bond. If the carbon atom is in a ring, the equivalent is "cycloaliphatic."

The monocarboxylic acid or equivalent can contain any substituent groups or combinations thereof, such as, for example, functional groups amide, amine, carbonyl, or halide, so long as the substituent groups do not interfere with the esterification reaction or adversely affect the properties of the resulting ester product.

The monocarboxylic acids and equivalents can be from any source, but preferably are derived from natural sources or are bio-derived.

The following acids and their equivalents are preferred: lauric, myristic, palmitic, stearic, arachidic, benzoic, caprylic, erucic, palmitoleic, pentadecanoic, heptadecanoic, nonadecanoic, linoleic, arachidonic, oleic, valeric, caproic, capric, 2-ethylhexanoic acids, isovaleric, isononanoic, neodecanoic, and mixtures thereof. Particularly preferred acids or derivatives thereof are 2-ethylhexanoic acid, benzoic acid, isostearic acid, lauric acid and oleic acid.

For preparation of the esters, the PO3G can be contacted, preferably in the presence of an inert gas, with the monocarboxylic acid(s) at temperatures ranging from about 160° C. to about 250° C., preferably from about 180° C. to about 225° C. The process can be carried out at atmospheric pressure or at a reduced pressure, but typically is above the boiling pressure of the monocarboxylic acid(s). A Dean-Stark apparatus can be used if the boiling point of monocarboxylic acid is above the reaction temperature to facilitate the continual replacement of evaporated acid to the reaction. The pressure can be about 1 mm Hg or greater, or about 50 mm Hg or greater, or about 75 mm HG or greater, or about 100 mm Hg or greater. Also, the pressure can be as high as about 760 mm Hg or ambient pressure. During the contact, water is formed and can be removed in the inert gas stream or under vacuum to drive the reaction to completion.

An equivalent molar excess of the monocarboxylic acid, or derivatives thereof, to glycol hydroxyl groups of the PO3G is desirable to make diesters with good conversions. Preferably the starting molar ratio of acid to the PO3G is greater than 1:1, or 1.5:1, or 1.9:1, or 2:1, or 2.7:1. The preferred ratio of acid to hydroxyl groups in the product is from 150 to 110. Since the monocarboxylic acid also functions as an esterfication catalyst, excess acid in the system drives the reaction faster. If monoesters or mixture of mono and diesters is desired, use of excess monocarboxylic acid can be avoided.

In one embodiment step b) of the process is performed in the presence of an organometallic catalyst.

By organo metallic catalyst is meant an organometal compound, a metal or a metal hydride together with a Group IV, V, VI or VIII metal compound. A very large number of specified organo-metallic catalysts include the aluminium alkyls, the aluminium hydrides, and the aluminium alkyl halides, as well as those of other Group I-III metals, together with the oxides, hydrides, halides, oxyhalides, alcoholates, and organic acid salts of titanium, zirconium, chromium thorium, molybdenum, vanadium, iridium and platinum.

Preferably the organometallic catalyst comprises Ti, Sn or Zn. More preferably the organometallic catalyst is a Ti, Sn or Zn alkyl or aryl alcohate such as tetraisopropylate, tetrabutylate, octylate, naphthenate. Most preferred is tetrabutyl titanate The amount of metal catalyst used can be from about 0 to 500 ppm of the reaction mixture.

In one embodiment the process can additionally comprise the step (c) of further heating the reaction mixture for at least 1 hours at a pressure of about 1 to about 50 mm Hg, or about 10 to about 30 mm Hg, and at a temperature of about 160° C. to about 250° C., or about 180° C. to about 225° C. The pressure is desirably lower than that in step (b) and is typically below the boiling pressure of the monocarboxylic acid(s). The reduction in pressure can remove excess acid and water, and can improve conversion of the polymer to the ester.

In another embodiment step (b) is performed at ambient pressure and at temperature of about 160° C. to about 250° C., or about 180° C. to about 225° C., and step (c) is preformed at 160° C. to about 250° C., or about 180° C. to about 225° C. and at a pressure of about 1 to about 50 mm Hg, or about 10 to about 30 mm Hg.

The polytrimethylene ether glycol esters prepared by the processes disclosed herein comprise one or more compounds of the formula:

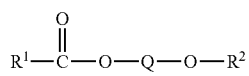

wherein Q represents the residue of a polytrimethylene ether glycol after abstraction of the hydroxyl groups, $R^2$ is H or $R^3CO$, and each of $R^1$ and $R^3$ is individually a substituted or unsubstituted aromatic, saturated aliphatic, unsaturated aliphatic, or cycloaliphatic organic group containing from 6 to 40 carbon atoms. In one embodiment $R^2$ is H.

The polytrimethylene ether glycol (PO3G) is an oligomeric or polymeric ether glycol in which at least 50% of the repeating units are trimethylene ether units. More preferably from about 75% to 100%, still more preferably from about 90% to 100%, and even more preferably from about 99% to 100%, of the repeating units are trimethylene ether units.

PO3G is preferably prepared by polycondensation of monomers comprising 1,3-propanediol, preferably in the presence of an acid catalyst, thus resulting in polymers or copolymers containing —(CH$_2$CH$_2$CH$_2$O)— linkage (e.g., trimethylene ether repeating units). As indicated above, at least 50% of the repeating units are trimethylene ether units.

Polytrimethylene ether glycol prepared from the polycondensation of 1,3-propanediol may contain unreacted 1,3-propanediol, and this diol monomer can also react with acid to form 1,3-propanediol esters. The presence of the 1,3-propanediol esters in the polytrimethylene ether glycol ester is not desirable because they can limit the use of polytrimethylene ether glycol esters in high temperature application. Therefore it is desirable that the starting polymer contains with low levels of unreacted diol monomer before esterification.

When a sulfur-based acid catalyst is utilized (such as sulfuric acid) to prepare the PO3G, the resulting product preferably contains less than about 20 ppm, more preferably less than about 10 ppm, of sulfur.

In addition to the trimethylene ether units, lesser amounts of other units, such as other polyalkylene ether repeating units, may be present. In the context of this disclosure, the term "polytrimethylene ether glycol" encompasses PO3G made from essentially pure 1,3-propanediol, as well as those oligomers and polymers (including those described below) containing up to about 50% by weight of comonomers.

The 1,3-propanediol employed for preparing the PO3G can be obtained by any of the various well known chemical routes or by biochemical transformation routes. Preferred routes are disclosed in, for example, U.S. Pat. No. 5,015,789, U.S. Pat. No. 5,276,201, U.S. Pat. No. 5,284,979, U.S. Pat. No. 5,334,778, U.S. Pat. No. 5,364,984, U.S. Pat. No. 5,364,987, U.S. Pat. No. 5,633,362, U.S. Pat. No. 5,686,276, U.S. Pat. No. 5,821,092, U.S. Pat. No. 5,962,745, U.S. Pat. No. 6,140,543, U.S. Pat. No. 6,232,511, U.S. Pat. No. 6,235,948, U.S. Pat. No. 6,277,289, U.S. Pat. No. 6,297,408, U.S. Pat. No. 6,331,264, U.S. Pat. No. 6,342,646, U.S. Pat. No. 7,038,092, U.S. Pat. No. 7,084,311, U.S. Pat. No. 7,098,368, U.S. Pat. No. 7,009,082 and US20050069997A1.

Preferably, the 1,3-propanediol is obtained biochemically from a renewable source ("biologically-derived" 1,3-propanediol).

A particularly preferred source of 1,3-propanediol is via a fermentation process using a renewable biological source. As an illustrative example of a starting material from a renewable source, biochemical routes to 1,3-propanediol (PDO) have been described that utilize feedstocks produced from biological and renewable resources such as corn feed stock. For example, bacterial strains able to convert glycerol into 1,3-propanediol are found in the species *Klebsiella*, *Citrobacter*, *Clostridium*, and *Lactobacillus*. The technique is disclosed in several publications, including U.S. Pat. No. 5,633,362, U.S. Pat. No. 5,686,276 and U.S. Pat. No. 5,821,092. U.S. Pat. No. 5,821,092 discloses, inter alia, a process for the biological production of 1,3-propanediol from glycerol using recombinant organisms. The process incorporates *E. coli* bacteria, transformed with a heterologous pdu diol dehydratase gene, having specificity for 1,2-propanediol. The transformed *E. coli* is grown in the presence of glycerol as a carbon source and 1,3-propanediol is isolated from the growth media. Since both bacteria and yeasts can convert glucose (e.g., corn sugar) or other carbohydrates to glycerol, the processes disclosed in the cited publications can provide a rapid, inexpensive and environmentally responsible source of 1,3-propanediol monomer.

The biologically-derived 1,3-propanediol, such as produced by the processes described and referenced above, contains carbon from the atmospheric carbon dioxide incorporated by plants, which compose the feedstock for the production of the 1,3-propanediol. In this way, the biologically-derived 1,3-propanediol contains only renewable carbon, and not fossil fuel-based or petroleum-based carbon. The PO3G and esters thereon utilizing the biologically-derived 1,3-propanediol, therefore, have less impact on the environment as the 1,3-propanediol used in the compositions does not deplete diminishing fossil fuels and, upon degradation, releases carbon back to the atmosphere for use by plants once again. Thus, the compositions prepared according to the methods disclosed herein can, in some embodiments, be characterized as more natural and having less environmental impact than similar compositions comprising petroleum based glycols.

The biologically-derived 1,3-propanediol, PO3G and PO3G esters, may be distinguished from similar compounds produced from a petrochemical source or from fossil fuel carbon by dual carbon-isotopic finger printing. This method usefully distinguishes chemically-identical materials, and apportions carbon in the copolymer by source (and possibly year) of growth of the biospheric (plant) component. The isotopes, $^{14}C$ and $^{13}C$, bring complementary information to this problem. The radiocarbon dating isotope ($^{14}C$), with its nuclear half life of 5730 years, clearly allows one to apportion specimen carbon between fossil ("dead") and biospheric ("alive") feedstocks (Currie, L. A. "Source Apportionment of Atmospheric Particles," *Characterization of Environmental Particles*, J. Buffle and H. P. van Leeuwen, Eds., 1 of Vol. I of the IUPAC Environmental Analytical Chemistry Series (Lewis Publishers, Inc) (1992) 3-74). The basic assumption in radiocarbon dating is that the constancy of $^{14}C$ concentration in the atmosphere leads to the constancy of $^{14}C$ in living organisms. When dealing with an isolated sample, the age of a sample can be deduced approximately by the relationship:

$$t = (-5730/0.693)\ln(A/A_0)$$

wherein t=age, 5730 years is the half-life of radiocarbon, and A and $A_0$ are the specific $^{14}C$ activity of the sample and of the modern standard, respectively (Hsieh, Y., *Soil Sci. Soc. Am J.*, 56, 460, (1992)). However, because of atmospheric nuclear testing since 1950 and the burning of fossil fuel since 1850, $^{14}C$ has acquired a second, geochemical time characteristic. Its concentration in atmospheric $CO_2$, and hence in the living biosphere, approximately doubled at the peak of nuclear testing, in the mid-1960s. It has since been gradually returning to the steady-state cosmogenic (atmospheric) baseline isotope rate ($^{14}C/^{12}C$) of ca. $1.2 \times 10^{-12}$, with an approximate relaxation "half-life" of 7-10 years. (This latter half-life must not be taken literally; rather, one must use the detailed atmospheric nuclear input/decay function to trace the variation of atmospheric and biospheric $^{14}C$ since the onset of the nuclear age.) It is this latter biospheric $^{14}C$ time characteristic that holds out the promise of annual dating of recent biospheric carbon. $^{14}C$ can be measured by accelerator mass spectrometry (AMS), with results given in units of "fraction of modern carbon" ($f_M$). $f_M$ is defined by National Institute of Standards and Technology (NIST) Standard Reference Materials (SRMs) 4990B and 4990C, known as oxalic acids standards HOxI and HOxII, respectively. The fundamental definition relates to 0.95 times the $^{14}C/^{12}C$ isotope ratio HOxI (referenced to AD 1950). This is roughly equivalent to decay-corrected pre-Industrial Revolution wood. For the current living biosphere (plant material), $f_M \approx 1.1$.

The stable carbon isotope ratio ($^{13}C/^{12}C$) provides a complementary route to source discrimination and apportionment. The $^{13}C/^{12}C$ ratio in a given biosourced material is a consequence of the $^{13}C/^{12}C$ ratio in atmospheric carbon dioxide at the time the carbon dioxide is fixed and also reflects the precise metabolic pathway. Regional variations also occur. Petroleum, $C_3$ plants (the broadleaf), $C_4$ plants (the grasses), and marine carbonates all show significant differences in $^{13}C/^{12}C$ and the corresponding $\delta^{13}C$ values. Furthermore, lipid matter of $C_3$ and $C_4$ plants analyze differently than materials derived from the carbohydrate components of the same plants as a consequence of the metabolic pathway. Within the precision of measurement, $^{13}C$ shows large variations due to isotopic fractionation effects. The major cause of differences in the carbon isotope ratio in plants is closely associated with differences in the pathway of photosynthetic carbon metabolism in the plants, particularly the reaction occurring during the primary carboxylation, i.e., the initial fixation of atmospheric $CO_2$. Two large classes of vegetation are those that incorporate the "$C_3$" (or Calvin-Benson) photosynthetic cycle and those that incorporate the "$C_4$" (or Hatch-Slack) photosynthetic cycle. $C_3$ plants, such as hardwoods and conifers, are dominant in the temperate climate zones. In $C_3$ plants, the primary $CO_2$ fixation or carboxylation reaction involves the enzyme ribulose-1,5-diphosphate carboxylase and the first stable product is a 3-carbon compound. $C_4$ plants, on the other hand, include such plants as tropical grasses, corn and sugar cane. In $C_4$ plants, an additional carboxylation reaction involving another enzyme, phosphenol-pyruvate carboxylase, is the primary carboxylation reaction. The first stable carbon compound is a 4-carbon acid, which is subsequently decarboxylated. The $CO_2$ thus released is refixed by the $C_3$ cycle.

Both $C_4$ and $C_3$ plants exhibit a range of $^{13}C/^{12}C$ isotopic ratios, but typical values are ca. −10 to −14 per mil ($C_4$) and −21 to −26 per mil ($C_3$) (Weber et al., *J. Agric. Food Chem.*, 45, 2942 (1997)). Coal and petroleum fall generally in this latter range. The $^{13}C$ measurement scale was originally defined by a zero set by pee dee belemnite (PDB) limestone, where values are given in parts per thousand deviations from this material. The "$\delta^{13}C$" values are in parts per thousand (per mil), abbreviated ‰, and are calculated as follows:

$$\delta^{13}C \equiv \frac{(^{13}C/^{12}C)\text{sample} - (^{13}C/^{12}C)\text{standard}}{(^{13}C/^{12}C)\text{standard}} \times 1000\%$$

Since the PDB reference material (RM) has been exhausted, a series of alternative RMs have been developed in cooperation with the IAEA, USGS, NIST, and other selected international isotope laboratories. Notations for the per mil deviations from PDB is $\delta^{13}C$. Measurements are made on $CO_2$ by high precision stable ratio mass spectrometry (IRMS) on molecular ions of masses 44, 45 and 46.

Biologically-derived 1,3-propanediol, and compositions comprising biologically-derived 1,3-propanediol, therefore, may be distinguished from their petrochemical derived counterparts on the basis of $^{14}C$ ($f_M$) and dual carbon-isotopic fingerprinting, indicating new compositions of matter. The ability to distinguish these products is beneficial in tracking these materials in commerce. For example, products comprising both "new" and "old" carbon isotope profiles may be distinguished from products made only of "old" materials. Hence, the instant materials may be followed in commerce on the basis of their unique profile and for the purposes of defining competition, for determining shelf life, and especially for assessing environmental impact.

Preferably the 1,3-propanediol used as the reactant or as a component of the reactant will have a purity of greater than about 99%, and more preferably greater than about 99.9%, by weight as determined by gas chromatographic analysis. Particularly preferred are the purified 1,3-propanediols as disclosed in U.S. Pat. No. 7,038,092, U.S. Pat. No. 7,098,368, U.S. Pat. No. 7,084,311 and US20050069997A1, as well as PO3G made therefrom as disclosed in US20050020805A1.

The purified 1,3-propanediol preferably has the following characteristics:

(1) an ultraviolet absorption at 220 nm of less than about 0.200, and at 250 nm of less than about 0.075, and at 275 nm of less than about 0.075; and/or (2) a composition having L*a*b* "b*" color value of less than about 0.15 (ASTM D6290), and an absorbance at 270 nm of less than about 0.075; and/or (3) a peroxide composition of less than about 10 ppm; and/or (4) a concentration of total organic impurities (organic compounds other than 1,3-propanediol) of less than about 400 ppm, more preferably less than about 300 ppm, and still more preferably less than about 150 ppm, as measured by gas chromatography.

The starting material for making PO3G will depend on the desired PO3G, availability of starting materials, catalysts, equipment, etc., and comprises "1,3-propanediol reactant." By "1,3-propanediol reactant" is meant 1,3-propanediol, and oligomers and prepolymers of 1,3-propanediol preferably having a degree of polymerization of 2 to 9, and mixtures thereof. In some instances, it may be desirable to use up to 10% or more of low molecular weight oligomers where they are available. Thus, preferably the starting material comprises 1,3-propanediol and the dimer and trimer thereof. A particularly preferred starting material is comprised of about 90% by weight or more 1,3-propanediol, and more preferably 99% by weight or more 1,3-propanediol, based on the weight of the 1,3-propanediol reactant.

PO3G can be made via a number of processes known in the art, such as disclosed in U.S. Pat. No. 6,977,291 and U.S. Pat. No. 6,720,459. The preferred processes are as set forth in U.S. Pat. No. 7,074,969, U.S. Pat. No. 7,157,607, U.S. Pat. No. 7,161,045 and U.S. Pat. No. 7,164,046.

As indicated above, PO3G may contain lesser amounts of other polyalkylene ether repeating units in addition to the trimethylene ether units. The monomers for use in preparing polytrimethylene ether glycol can, therefore, contain up to 50% by weight (preferably about 20 wt % or less, more preferably about 10 wt % or less, and still more preferably about 2 wt % or less), of comonomer polyols in addition to the 1,3-propanediol reactant. Comonomer polyols that are suitable for use in the process include aliphatic diols, for example, ethylene glycol, 1,6-hexanediol, 1,7-heptanediol, 1,8-octanediol, 1,9-nonanediol, 1,10-decanediol, 1,12-dodecanediol, 3,3,4,4,5,5-hexafluoro-1,5-pentanediol, 2,2,3,3,4,4,5,5-octafluoro-1,6-hexanediol, and 3,3,4,4,5,5,6,6,7,7,8,8,9,9,10,10-hexadecafluoro-1,12-dodecanediol; cycloaliphatic diols, for example, 1,4-cyclohexanediol, 1,4-cyclohexanedimethanol and isosorbide; and polyhydroxy compounds, for example, glycerol, trimethylolpropane, and pentaerythritol. A preferred group of comonomer diols is selected from the group consisting of ethylene glycol, 2-methyl-1,3-propanediol, 2,2-dimethyl-1,3-propanediol, 2,2-diethyl-1,3-propanediol, 2-ethyl-2-(hydroxymethyl)-1,3-propanediol, $C_6$-$C_{10}$ diols (such as 1,6-hexanediol, 1,8-octanediol and 1,10-decanediol) and isosorbide, and mixtures thereof. A particularly preferred diol other than 1,3-propanediol is ethylene glycol, and $C_6$-$C_{10}$ diols can be particularly useful as well.

Preferably, the PO3G after purification has essentially no acid catalyst end groups, but may contain very low levels of unsaturated end groups, predominately allyl end groups, in the range of from about 0.003 to about 0.03 meq/g. Such a PO3G can be considered to comprise (consist essentially of) the compounds having the following formulae (II) and (III):

HO—((CH$_2$)$_3$O)$_m$—H          (II)

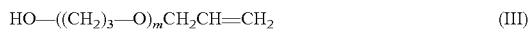
HO—((CH$_2$)$_3$—O)$_m$CH$_2$CH=CH$_2$          (III)

wherein m is in a range such that the Mn (number average molecular weight) is within the range of from about 200 to about 10000, with compounds of formula (III) being present in an amount such that the allyl end groups (preferably all unsaturation ends or end groups) are present in the range of from about 0.003 to about 0.03 meq/g.

The preferred PO3G for use in the processes disclosed herein has an Mn (number average molecular weight) of at least about 250, more preferably at least about 500, and still more preferably at least about 1000. The Mn is preferably about 5000 or less, more preferably about 2500 or less, and still more preferably about 2000 or less.

PO3G for use in the processes disclosed herein is typically polydisperse, having a polydispersity (i.e. Mw/Mn) of preferably from about 1.1 to about 2.2, more preferably from about 1.2 to about 2.2, and still more preferably from about 1.5 to about 2.1. The polydispersity can be adjusted by using blends of PO3G.

The polytrimethylene ether glycol ester or diester, or mixtures thereof prepared by the processes disclosed herein can have a viscosity ranging from about 20 to about 1000 cSt at 40° C. and a viscosity index is greater than 150.

The product can be purified to remove water, catalyst and unreacted carboxylic acid by the known conventional techniques such as water washings, base neutralization, filtration and/or distillation. Unreacted diol and monocarboxylic acid, for example, be removed by washing with deionized water or by vacuum stripping.

EXAMPLES

The polytrimethylene ether glycol (Cerenol® H1400) utilized in the examples was obtained from E.I. DuPont de Nemours & Co., Wilmington, Del., US and had a number average molecular weight of 1417 g mol$^{-1}$ containing 760 ppm (0.076 weight %) unreacted diol monomer. The titanium content quoted refers to the metal content of the reaction mixture. The catalyst used was tetrabutyl orthotitanate, obtained from Tokyo Chemical Industry Co., ltd, Tokyo, JP. The 2-ethylhexanoic acid used was obtained from Alfa Aesar, Heysham, UK. The amount of 1,3-propanediol in Cerenol® H1400, the amount of esterified end groups in the product, the number average molecular weight of the product and the amount of unreacted acid in the product were determined by NMR spectroscopy using techniques known to one skilled in the art.

Dean-Stark apparatus' refers to a piece of equipment well known to one skilled in the art, which facilitates the continual replacement of evaporated acid to the reaction.

Examples

Example 1

This example illustrates the synthesis of a 2-ethylhexanoate ester of polytrimethylene ether glycol without catalyst, using 130 mol % acid at 225° C.

A 1 L round bottom flask fitted with a Dean-Stark apparatus, nitrogen inlet and an overhead stir was charged with polytrimethylene ether glycol (549 g, 0.39 mol). The liquid was heated to 225° C. with stirring at 400 rpm and with a stream of nitrogen passing in the head space of the reaction. When the reaction reached 225° C., 2-ethylhexanoic acid (147 g, 1.02 mol, 130 mol %) was slowly added. The reaction was allowed to proceed for 7 hours at 225° C. during which the distillate water was collected. The percent conversion was measured using NMR and reported in Table 1.

Example 2

This example illustrates the synthesis of a 2-ethylhexanoate ester of polytrimethylene ether glycol with 84 ppm titanium, using 95 mol % acid at 180° C.

A 1 L round bottom flask fitted with a condenser, nitrogen inlet and an overhead stir was charged with polytrimethylene ether glycol (600 g, 0.42 mol). The liquid was heated to 180° C. with stirring at 400 rpm and with a stream of nitrogen passing beneath the surface of the reaction. When the reaction reached 180° C., 2-ethylhexanoic acid (117 g, 0.81 mol, 95 mol %) and tetrabutyl orthotitanate (0.4267 g, 84 ppm) were slowly added. The reaction was allowed to proceed for 13 hours at 180° C. and 5 hours at 190° C. during which the distillate water was collected. The percent conversion was measured using NMR and reported in Table 1.

Example 3

This example illustrates the synthesis of a 2-ethylhexanoate ester of polytrimethylene ether glycol with 193 ppm titanium, using 100 mol % acid at 225° C.

A 1 L round bottom flask fitted with a Dean-Stark apparatus, nitrogen inlet and an overhead stir was charged with polytrimethylene ether glycol (512 g, 0.36 mol). The liquid was heated to 225° C. with stirring at 400 rpm and with a stream of nitrogen passing beneath the surface of the reaction. When the reaction reached 225° C., 2-ethylhexanoic acid (105 g, 0.73 mol, 100 mol %) and tetrabutyl orthotitanate (0.8452 g, 193 ppm) were slowly added. The reaction was allowed to proceed for 7 hours at 225° C. during which the distillate water was collected. The percent conversion was measured using NMR and reported in Table 1.

Example 4

This example illustrates the synthesis of a 2-ethylhexanoate ester of polytrimethylene ether glycol using 183 ppm titanium, 130 mol % acid at 225° C., followed by the effective removal of the excess acid.

The reaction was carried out as in example 3 except nitrogen was passed through the head space and 137 g (0.95 mol, 130 mol %) 2-ethylhexanoic acid was used. The percent conversion was measured using NMR and reported in Table 1. The product was then processed further to remove the excess of carboxylic acid.

The pressure was reduced to 20 mmHg with dry nitrogen passing beneath the surface of the liquid. The reaction was heated to 225° C. over one hour and maintained for a further 4.5 hours; after which time 30 mL distillate was collected yielding the dried product (597 g, 99%). The final product was shown through NMR to have a number average molecular weight of 1630 g/mol and a final mol % conversion of hydroxyl groups of 98%. The final product was shown through titration to have an acid number of 0.033 mg KOH/g.

TABLE 1

All parts are by weight unless otherwise indicated. The levels of titanium quoted are relative to the calculated final mass of product.

| Ex | Mass Cerenol ® H1400 (g) | Mass 2-ethylhexanoic acid (g) | Approx. Catalyst Conc. (ppm Ti) | Temperature (° C.) | Time Reacted (h) | Conversion of hydroxyl groups (mol %) |
|---|---|---|---|---|---|---|
| 1 | 549 | 147 | 0 | 225 | 7 | 56 |
| 2 | 600 | 117 | 100 | 180/190 | 18 | 68 |
| 3 | 512 | 105 | 200 | 225 | 7 | 80 |
| 4 | 512 | 137 | 200 | 225 | 7 | 96 |

The viscosity and viscosity index data for the diester product from Example 4 was measured using ASTM D445-96 and compared with the starting material, and the results are reported in Table 2. It can be seen that the viscosity of the diester significantly decreased but surprisingly had higher viscosity index value, which is desirable for lubrication application.

TABLE 2

Viscosity data for poly(trimethylene ether) glycol 2-ethylhexanoate

| | Viscosity @ 40° C. (cSt) | Viscosity @ 100° C. (cSt) | Viscosity Index |
|---|---|---|---|
| Cerenol ® H1400 | 377 | 58 | 225 |
| Poly(trimethylene ether) glycol 2-ethylhexanoate, 98% conversion | 275 | 46 | 230 |

What is claimed is:

1. A process for preparing a monocarboxylic acid ester of a polytrimethylene ether glycol comprising:
   (a) providing a polytrimethylene ether glycol having a number average molecular weight of about 250 to about 5000 and containing less than about 1 weight % of unreacted diol monomer;
   (b) heating the polytrimethylene ether glycol for at least 5 hours under inert gas at an initial pressure and at a temperature of about 160° C. to about 250° C. in the presence of a molar excess of one or more monocarboxylic acids or monocarboxylic acid equivalents to form a reaction mixture;
      wherein the or monocarboxylic acid or monocarboxylic acid equivalent has the formula R—COOH, wherein R is an a substituted or unsubstituted aromatic, saturated linear or branched aliphatic, unsaturated aliphatic, or cycloaliphatic organic group containing from 6 to 40 carbon atoms; and
   (c) further heating the reaction mixture for at least 1 hour at a second pressure of about 50 mm Hg or less and at a temperature of about 160° C. to about 250° C., wherein the second pressure is less than the initial pressure;
   to form a polytrimethylene ether glycol monoester or diester, or mixtures thereof.

2. The process of claim 1 wherein the polytrimethylene ether glycol monoester or diester comprises one or more compounds of the Formula:

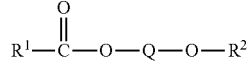

wherein Q represents the residue of a polytrimethylene ether glycol after abstraction of the hydroxyl groups, R2 is H or R3CO, and each of R1 and R3 is individually a substituted or unsubstituted aromatic, saturated aliphatic, unsaturated aliphatic, or cycloaliphatic organic group containing from 6 to 40 carbon atoms.

3. The process of claim 1 wherein step b) is performed in the presence of an organometallic catalyst.

4. The process of claim 3 wherein the organometallic catalyst comprises Ti, Sn or Zn.

5. The process of claim 1 wherein the monocarboxylic acid is selected from the group consisting of lauric, myristic, palmitic, stearic, arachidic, benzoic, caprylic, palmitic, erucic, palmitoleic, pentadecanoic, heptadecanoic, nonadecanoic, linoleic, arachidonic, oleic, valeric, caproic, capric, 2-ethylhexanoic acid, and mixtures thereof.

6. The process of claim 1, wherein the monocarboxylic acid or monocarboxylic acid equivalent is derived from a natural source or is bio-derived.

7. The process of claim 1, wherein the polytrimethylene ether glycol is prepared from the polycondensation of hydroxyl groups-containing monomers.

8. The process of claim 1 wherein the polytrimethylene ether glycol is obtained biochemically from a renewable source.

9. A polytrimethylene ether glycol monoester or diester, or mixture thereof prepared by the process of claim 1 that has a viscosity of about 20 to about 1000 cSt at 40° C. and a viscosity index is greater than 150.

\* \* \* \* \*